United States Patent [19]

Koniz et al.

[11] 4,089,811

[45] May 16, 1978

[54] PREPARATION OF CATALYST SUPPORT

[75] Inventors: Leon F. Koniz, Poughkeepsie; John H. Estes, Wappingers Falls, both of N.Y.

[73] Assignee: Texaco Inc., New York, N.Y.

[21] Appl. No.: 737,304

[22] Filed: Nov. 1, 1976

[51] Int. Cl.$^2$ .............................................. B01J 21/04
[52] U.S. Cl. ..................................... 252/463; 423/628
[58] Field of Search ................ 252/463; 423/625, 628

[56] References Cited

U.S. PATENT DOCUMENTS

| | | | |
|---|---|---|---|
| 3,188,174 | 6/1965 | Kehl et al. | 252/463 X |
| 3,346,336 | 10/1967 | Hayes | 252/463 X |
| 3,645,914 | 2/1972 | Rosinski et al. | 252/463 X |
| 3,669,904 | 6/1972 | Cornelius et al. | 252/463 X |

*Primary Examiner*—W. J. Shine
*Attorney, Agent, or Firm*—Thomas H. Whaley; Carl G. Ries; Carl G. Seutter

[57] ABSTRACT

Alumina, derived as by-product of the Zeigler-catalyzed higher alcohol process, is converted to beta alumina trihydrate and alpha alumina trihydrate in controlled proportions and thence to the catalytic transition aluminas.

19 Claims, No Drawings

PREPARATION OF CATALYST SUPPORT

FIELD OF THE INVENTION

This invention relates to a method of converting certain aluminas to more desirable forms of alumina. More particularly it relates to a method of upgrading the alumina by-product of the Ziegler higher alcohol process.

BACKGROUND OF THE INVENTION

There are currently available on the market certain highly pure alpha alumina monohydrates which are particularly characterized by their high content of alpha alumina monohydrate and by their low content of other forms of alumina. In many instances, the purity of these materials may approach 100% alpha alumina monohydrate.

It is a particular feature of these aluminas that they are substantially free of (or at least contain a very low content of) impurities which are usually found in prior art aluminas — and the most common of these impurities is sodium.

These aluminas are typically recovered as by products of the so-called Ziegler syntheses — in particular the Ziegler synthesis of higher alcohols — see for example U.S. Pat. No. 2,892,858 which discloses an illustrative process. The Ziegler process typically uses a catalyst containing a titanium composition, such as titanium tetrachloride, and an aluminum compound such as diethyl aluminum chloride.

Upon completion of the Ziegler reactions, the catalyst may ultimately be recovered as and converted to a pure alpha alumina monohydrate which contains titanium as the principal impurity — typically in amount of 150–700, say 600 ppm.

The commonly available Catapal S grade of alumina, derived from by-product recovery of Ziegler catalyst typically contains (in addition to titanium as noted supra) 80–120 ppm, say about 100 ppm silicon; 27–61 ppm, say 40 ppm of iron; 14–70 ppm, say 50 ppm of magnesium; and alkali metals including sodium at a level which is too low to be detected by the usual gravimetric methods of analysis.

Such aluminas, typified by Catapal S, would be expected to be of high utility as catalyst supports. This is in fact not found to be the case. It appears that catalyst pellets formed from these aluminas are less than fully satisfactory because the pellets exhibit an undesirably high tendency to produce fines resulting from the physical deterioration of the pellet.

OBJECT OF THE INVENTION

It is an object of this invention to provide a process for modifying an alumina. It is a particular object of this invention to provide a process for modifying a Catapal-type high purity alumina so that it is particularly characterized by its versatility.

STATEMENT OF THE INVENTION

In accordance with certain of its aspects, the novel process of this invention for treating a charge alpha alumina monohydrate characterized by high purity, by substantial absence of alkali metal ions, and by presence of titanium as a principal impurity, may comprise (i) calcining said charge alpha alumina monohydrate at temperature of about 800° F–900° F for 1–3 hours thereby forming a calcined charge alumina containing gamma alumina;

(ii) mixing said calcined charge alumina containing gamma alumina with about 2–10 times its weight of water thereby forming a wetted alumina; and (iii) heating said wetted alumina at pH of about 6–12.5 to about 190° F–250° F for 8–24 hours thereby forming a heated alumina containing beta alumina trihydrate.

DESCRIPTION OF THE INVENTION

The charge alumina which may be treated by the process of this invention may be a high purity alpha alumina monohydrate which is particularly characterized (i) by substantial absence of alkali metal, and (ii) by the presence of titanium as a principal impurity.

Although such charge aluminas may contain as little as 80 w % alumina they more commonly may contain as much as 100 w % of alumina. Of the alumina content, 85 w % — 100 w %, say 95 w % may be alpha alumina monohydrate; and the remainder may typically include other forms of alumina.

The charge alumina may typically contain no measurable content of alkali metal when measured as sodium by standard gravimetric techniques. The principal impurity normally is titanium dioxide $TiO_2$ in amount (as $TiO_2$) of 150–700 ppm, typically 500–700 ppm, say 600 ppm. Other impurities typically include: $SiO_2$ silicon dioxide in amount (as $SiO_2$) of 80–120 ppm, say 100 ppm; iron oxides in amount (as $Fe_2O_3$) of 27–61 ppm, say 40 ppm; alkaline earth metals in amount (as MgO) of 14–70 ppm, say 50 ppm; and alkali metals in amount (as $Na_2O$) too low to determine by the usual gravimetric analytical techniques. The titanium, silicon, iron, and alkaline earth metals are present as oxides (either as such or as in complexes); and for convenience the concentration is reported as pure metal. The charge alumina may be substantially free of other impurities.

Although it may be possible to use as charge to the process of this invention alpha alumina monohydrates obtained from other sources or from other processes, it is found that the advantages of this invention are particularly outstanding when the charge alpha monohydrated alumina is a Catapal-S-type alumina derived as a by-product of the Ziegler process for making higher alcohols.

In practice of the process of this invention, the charge alpha alumina monohydrate, containing at least about 85% of alpha alumina monohydrate is calcined at temperatures of 800° F–900° F, say about 850° F for 1–3 hours, say 2 hours. It is a feature of the process of this invention that calcination be effected within the prescribed temperature range or the desired results will not be achieved. Specifically, if calcining is effected below the lower end of the range of 800° F–900° F (e.g. at 700° F) or above the upper end of that range (e.g. at 1,000° F), then the subsequent steps will not permit attainment of the desired product. It appears that temperatures below the range specified will not decompose the monohydrate in a reasonable period of time and if the heating is carried out above the noted range, the more severe conditions (of temperature) required for rehydration, undesirably result in the reformation of substantial amounts of alpha alumina monohydrate.

Calcination may be effected in the presence of inert gas such as air; and it is not necessary to control the humidity of the environment in which calcination is effected. Typically the atmosphere may be dry air.

The product recovered from calcination of the charge alumina is a calcined charge alumina containing gamma alumina containing at least about 80%, typically 85%–95%, say 90% of gamma alumina — the remainder being substantially entirely alpha alumina monohydrates.

Calcination of 100 parts of charge alumina may yield 85–90 parts, say 90 parts of calcined charge alumina containing gamma alumina.

The calcined charge alumina may be mixed with water in amounts of 2–10 times, say 5 times the weight of calcined charge alumina thereby forming a wetted alumina. In typical embodiment, 100 parts of calcined charge alumina may be mixed with 500 parts of water. During mixing, the water and the alumina may preferably be at 190° F–250° F, say 230° F which is the temperature of the following heating step. Although it may be possible that the mixture may be superficially dry (when operating with amounts of water falling at the lower end of the range), in the preferred embodiment the wetted alumina may be a slurry.

As so obtained, this pH of the slurry may be 6–12.5, say 7.5 depending on the properties desired in the final product. Measurement of the pH (as used in this specification) of an alumina may be effected by adding 100 parts of alumina to 500 parts of distilled water at 70° F, agitating for 15 minutes, and measuring the pH of the slurry by use of suitable equipment.

It is a feature of the process of this invention that the pH of the wetted alumina be within the range 6–12.5. In a particularly desirable embodiment, when the calcined charge alumina is already within this range (eg at about 6), further processing may be carried out, after mixing with water, without further adjusting the pH. This embodiment commonly permits attainment in subsequent steps of maximum production of desired beta alumina trihydrate and ultimately eta alumina.

Maximum production of beta alumina trihydrate may be attained generally by operation at a pH of 6–10, say 9.4.

It is a feature of the process of this invention, in its more typical embodiments, that the pH of the wetted alumina be adjusted to fall within the range of say 10–12.5, as the calcined charge alumina may usually have a pH below the lower end of this range. Increasing the pH to above 10 and as high as 12 permits increase in the conversion of charge alpha alumina monohydrate to alpha alumina trihydrate to a point at which the latter may be about 50 w % of the total alumina — the remainder being principally beta alumina trihydrate. Thus it is possible to control the relative proportions of these two materials (obtained after subsequent heating) by adjusting the pH prior to heating.

The pH may be adjusted by addition of a base. It may for example be possible to adjust the pH by addition of alkali metal hydroxides (preferably in aqueous solutions) such as potassium hydroxide, sodium hydroxide, aqueous ammonium hydroxide etc. or alkaline earth metal oxides or hydroxides such as calcium hydroxide (or calcium oxide) etc. Addition of such compositions is generally undesirable because in many catalyst systems, these metals (particularly alkali metals such as sodium) are detrimental to catalytic activity.

In the preferred embodiment, adjustment of the pH may be effected by the addition of an organic base containing at least one nitrogen atom. (It will be noted that this permits maintenance of the low sodium content of the alumina.) Illustrative of organic bases which may be employed are the following:

TABLE

Methylamine
Dimethylamine
Trimethylamine
Ethylamine
Diethylamine
n-propylamine
n-butylamine
Di-n-butylamine
Tri-n-hexylamine
Ethylene Diamine
Tetramethylene Diamine
Hexamethylene Diamine
Ethanolamine
Diethanolamine
Triethanolamine
Piperidine
Pyrrolidine
Morpholine Although aromatic amines or heterocyclic nitrogen-containing compounds may be employed, the preferred of the above may be alkyl amines wherein the total number of carbon atoms in all the alkyl groups present may be 4–8.

It is, however, a preferred feature of the process of this invention that the pH of the wetted alumina be adjusted to fall within the noted range as by addition thereto (per 100 parts of alumina) of 5–10 parts, say 7 parts of a tetra-alkyl ammonium hydroxide, preferably a tetra (lower alkyl e.g. $C_1$–$C_6$) ammonium hydroxide. Illustrative of such compounds may be those of the following table:

TABLE

Tetramethyl ammonium hydroxide
Tetraethyl ammonium hydroxide
Methyl, triethyl ammonium hydroxide
Tetrapropyl ammonium hydroxides
Methyl, tricyclohexyl ammonium hydroxide The preferred of the above may be tetramethyl ammonium hydroxide.

Although it may be desirable to adjust the pH of the wetted alumina, it may be possible to conduct the mixing (i.e. wetting) and adjusting steps simultaneously, i.e. to add the pH adjusting agent(s) simultaneously with, or in the water which is used to wet the alumina. In this instance, several preliminary runs may be carried out to determine the desired amount of pH adjusting agent; and it may be desirable to add less of the agent with the water, the remainder being added after mixing of the water is completed. Clearly more than one pH adjusting agent may be used if desired.

Mixing may be carried out in any convenient mixing or tumbling apparatus.

The wetted alumina, at pH of 6–12.5, say about 10 is heated to 190° F–250° F, say 230° F over 8–24 hours, say 18 hours. Heating may be effected in the presence of air, dry or moist, or in the presence of the autogenous atmosphere — humid or moist air. During heating, the wetted alumina, containing gamma alumina, may be rehydrated and converted to a product containing a substantial portion eg 50 w % – 90 w % of beta alumina trihydrate, a lesser portion eg 5 w % – 50 w % of alpha alumina trihydrate and 0%–15 w % of alpha alumina monohydrate.

Typically the hydrated product alumina may be characterized as in the following table which shows in Column A, a typical composition produced when the alumina is heated at pH of 6, at 230° F for 18 hours with 5 times its weight of water. Column B shows a typical composition produced when the alumina is heated at pH of 9.4 at 230° F for 18 hours with 5 times its weight of water, and ammonium hydroxide in amount of 1 w % of the alumina. Column C shows a typical composition produced when the alumina is heated at pH of 12.1 at 230° F for 18 hours with 5 times its weight of water, and tetramethyl ammonium hydroxide in amount of 2.5 w % of the alumina.

TABLE

| Component | A | B | C |
| --- | --- | --- | --- |
| Alpha Alumina monohydrate | 10 | — | 5 |
| Alpha Alumina trihydrate | 10 | 20 | 40 |
| Beta Alumina trihydrate | 80 | 80 | 55 |

The alpha alumina monohydrate in these preparations is derived from the trihydrate by dissociation; and the amount will vary with the time allowed for rehydration. Preferably it may be minimized by effecting rehydration for a time which is 8–12 hours and by maintaining the pH in the middle of the 6–12.5 range eg at about 8–10, say 9.4.

From the above Table, it will be apparent that heating the wetted alumina at pH 6–12.5 permits conversion of charge alpha alumina monohydrate to product containing the desired beta alumina trihydrate. It will be particularly apparent that it may be possible for example to attain product containing 80% of the desired beta alumina trihydrate by operating at a pH of 6–10, say 9.4. If it be desired to increase the content of alpha alumina trihydrate in the product to eg 40 w % of the total, then the pH should be adjusted to 10–12.5, say 12.1: but as noted supra, this may tend to increase the content of alpha alumina monohydrate.

The alpha alumina monohydrate in the heated hydrated product may be derived from the alpha alumina trihydrate by dissociation during the heating-rehydration step (rather than from the charge alpha alumina monohydrate. This may be decreased by operating in the lower portion of the 8–24 hour range (eg 8–12, say 10 hours) or increased by operating in the upper portion of the range (eg 12–24, say 18 hours.

It may be desirable to use the so-prepared product as is i.e. as a catalyst support or for other uses. In another embodiment, it may be desirable to convert the product containing beta alumina trihydrate to an alpha alumina monohydrate by heating to 350° F– 400° F, say 350° F for 24–48 hours, say 40 hours. The so-prepared alpha alumina monohydrate may, if desired, readily be converted to gamma alumina by heating to 850° F– 1250° F for 2–6 hours, say 5 hours.

In practice of the process of this invention in accordance with a preferred embodiment, the hydrated alumina (typified for example by that of Column B of the Table supra — containing 80 w % beta alumina trihydrate and 20 w % alpha alumina trihydrate) may be pelleted in standard manner and calcined at 850° F–1250° F, say 1000° F for 2–6 hours, say 4 hours, in the presence of dry air. The product formed may contain 25 w %–50 w %, say 35 w % of gamma alumina and 50 w %–75 w %, say 65 w % of eta alumina.

The aluminas, containing titanium as the principal impurity in an otherwise highly pure alumina, such as those available as the Catapal, Catapal S, Catapal N, Catapal HP-20, etc. grades, may be readily converted to product containing predominantly beta alumina trihydrate, or alternatively various mixtures of alpha and beta alumina trihydrate, by proper calcining and pH control prior to or during rehydration. The ease with which the noted charge aluminas may be converted to low sodium products including eta aluminas permits economic recovery of the latter at a price which makes them competitive with gamma aluminas.

More particularly the novel process of this invention permits conversion of the Catapal-type aluminas to useful product aluminas: for example (i) to convert the Catapal type alumina predominantly to the beta alumina trihydrate and thence to the desired eta alumina or alternatively (ii) to convert the Catapal-type alumina predominantly to beta alumina trihydrate, then to convert the latter to an alpha alumina monohydrate which may then be converted to a gamma alumina if desired.

By way of illustration, the predominantly beta alumina trihydrate of (i) supra may be converted to eta alumina as by heating to 482° F–932° F, say 850° F for 2–24 hours, say 3 hours at atmospheric pressure in dry air. The beta alumina trihydrate may be converted to an alpha alumina monohydrate for example by spray drying a slurry thereof at 250° F–300° F; the recovered alpha alumina monohydrate may be converted to gamma alumina by calcining at 932° F–1562° F, say 1200° F for 12–24 hours, say 18 hours, etc.

It is thus possible by use of the process of the instant invention to obtain a whole spectrum of high purity (particularly of low alkali metal content) aluminas from raw material with a limited range of utility primarily because only gamma alumina results from activation; and the inherent physical characteristics are such that it is difficult to prepare sufficiently strong catelyst support for commercial use.

The novel products of this invention, according to certain of its aspects, may be characterized by their high purity, typically approaching 100% alumina, and by the fact that the principal impurity which they contain may be titanium (present as $TiO_2$) in amount of 150–700 ppm, typically 500–700 ppm, say 600 ppm. In the preferred embodiment, these product aluminas are particularly characterized by the substantial absence of alkali metal (measured as sodium) as determined by standard gravimetric techniques.

These product aluminas may also be characterized by a low silicon content of 80–120 ppm, say 100 ppm of $SiO_2$, a low iron content of 27–61 ppm, say 40 ppm of Fe, and a low alkaline earth metal content of 14–70 ppm, say 50 ppm as MgO; and they may be substantially free of other impurities (i.e. the content of other impurities may usually be less than about 100 ppm and commonly less than 10–20 ppm.

It is a feature of the alumina products that they may be used in (or converted to other aluminas eg as herein disclosed which may be used in) catalyst compositions. The so-prepared compositions may be particularly characterized by their unusually high purity — principally the low alkali-metal content — and by their unexpected physical properties including low deterioration under attrition and low production of fines.

DESCRIPTION OF PREFERRED EMBODIMENTS

Practice of the process of this invention will be apparent to those skilled in the art from inspection of the following illustrative embodiments wherein, as elsewhere in this description all parts, percents, etc. are by weight unless otherwise specifically stated.

EXAMPLE I a. In this experimental run carried out in accordance with the process of this invention, 100 parts of Catapal S alpha alumina monohydrate (containing essentially 100 w % alpha alumina monohydrate) are employed as charge alpha alumina monohydrate. This charge contains as impurities: $TiO_2$ (600 ppm Ti), $SiO_2$ (100 ppm Si), iron 40 ppm, magnesium 50 ppm, and no measurable content of alkali metal.

b. This charge alumina may be calcined in air for 2 hours at 850° F (445° C) to convert it to a calcined charge alumina, having a pH of 6, containing 90 w % gamma alumina and 10 w % alpha alumina monohydrate.

c. The calcined charge alumina containing gamma alumina, 100 parts, may be mixed with 500 parts of distilled water; and the wetted alumina treated to change its pH to 12.0 by addition of tetramethyl ammonium hydroxide in amount of 2.5 parts to form 600 parts of wetted alumina.

d. The wetted alumina may be heated to 230° F (110° C) for about 18 hours (overnight) thereby forming a heated (i.e. rehydrated) alumina containing 65% beta alumina trihydrate, 30% alpha alumina trihydrate, and 5% alpha alumina monohydrate.

e. The rehydrated product may then be pelletted in standard manner as by extrusion.

f. The pelletted alumina may then be calcined in moist air at 850° F (440° C) for 2–4 hours to form an eta alumina.

Use of this eta alumina pellet as catalyst support permits attainment of a catalyst system which is characterized by high integrity by low tendency to develop fines, and thus by an extended life during which the pellet is maintained.

EXAMPLE II

In this example of the process of the invention, the procedure of Example I was followed except that, since the calcined alumina prepared according to step (b) is found to have a pH of 6.1, no tetramethyl ammonium hydroxide was added in step (c).

After heating as in step (d), the heated-rehydrated alumina may be found to contain:

65 w % beta alumina trihydrate
30 w % alpha alumina trihydrate
5 w % alpha alumina monohydrate The product may be calcined in moist air at 395° F (200° C) to yield a product containing:

70 w % beta alumina trihydrate
30 w % alpha alumina monohydrate.

In this product, the X-ray diffraction spectral lines of the alpha alumina monohydrate are found to be sharp as opposed to the diffuse lines noted in the charge Catapal S alpha alumina monohydrate.

This product is also found to be capable of being used as a catalyst pellet which (unlike the Catapal S charge alumina or products derived therefrom by techniques outside the scope of this invention) is characterized by low tendency to develop fines and by high degree of particulate integrity.

Results comparable to those of Example I may be achieved by using the following compositions to adjust the pH to within the desired range:

| Example | pH | % | Composition |
|---|---|---|---|
| III | 12.0 | 2.5 | Tetraethylammonium hydroxide |
| IV | 9.4 | 1.0 | Ammonium hydroxide |
| V | 8.8 | 1.0 | Tetramethylammonium hydroxide |
| VI | 11 | 1.0 | Sodium hydroxide (20% aqueous) |

It should be noted that Example VI shows that the pH may be adjusted by the use of an aqueous solution of sodium hydroxide. Where the presence of sodium ion in the final catalyst is not objectionable (or is desirable) sodium hydroxide may be used. It will be apparent however that this is generally a less preferred reagent. Since it is a feature of the novel products, in the preferred embodiments that they are free of alkali metals such as sodium, it will usually be desirable to maintain this low concentration and to use as the preferred pH adjusting agents those organic nitrogen bases typified by that of preferred Example II supra.

It is a particular feature of the process of this invention that both the charge alumina and the product alumina are characterized by the same content of "impurities" i.e. titanium, iron, sodium etc. and the concentration of these is maintained essentially constant at the very low levels found in the charge Catapal aluminas. In normal operation, there is no addition of such components and in particular there is no removal as by filtration, etc. The wetted alumina (which has already been calcined) is passed to the heating step "as is"; there is no intermediate treating step of filtration to remove any components such as iron or sodium. (See East German Pat. No. DDR 92,706 Anmeldetag September 22, 1971, Ausgabetag Sept. 20, 1972 reported at 67 CA 339 (1973) to Pohl et al contra.)

In fact in one embodiment of this invention, sodium hydroxide may be added to adjust the pH: viz. when the product alumina is to be used in a process in which sodium is not objectionable. In this illustrative instance, the alkali metal content of the product is clearly higher than the alkali metal content of the charge.

Regardless of whether or not the charge alumina and the alumina produced by the process of this invention contain the same quantity of sodium and iron (as is normally the case) or an increased amount of sodium (as would be the case in one embodiment), it is still found that the product alumina is unexpectedly characterized by low tendency to develop fines and by high degree of particulate integrity.

Although this invention has been illustrated by reference to specific embodiments, it will be apparent to those skilled in the art that various changes and modifications may be made which clearly fall within the scope of this invention.

We claim:

1. The method of treating a charge alpha alumina monohydrate characterized by high purity, by substantial absence of alkali metal ions, and by presence of titanium as a principal impurity which comprises:

(i) calcining said charge alpha alumina monohydrate at temperature of about 800° F–900° F for 1–3 hours thereby forming a calcined charge alumina containing gamma alumina;

(ii) mixing said calcined charge alumina containing gamma alumina with about 2–10 times its weight of water thereby forming a wetted alumina; and (iii) heating said wetted alumina at pH of about 6–12.5 to about 190° F–250° F for 8–24 hours thereby forming a heated alumina containing beta alumina trihydrate.

2. The method of treating a charge alumina as claimed in claim 1 wherein calcining is carried out at about 850° F.

3. The method of treating a charge alumina as claimed in claim 1 wherein said calcined charge alumina is mixed with about 5 times its weight of water.

4. The method of treating a charge alumina as claimed in claim 1 wherein said mixing is carried out at about 190° F–250° F.

5. The method of treating a charge alumina as claimed in claim 1 wherein said wetted alumina is in slurry form.

6. The method of treating a charge alumina as claimed in claim 1 wherein the pH of the wetted alumina is 6–12.5.

7. The method of treating a charge alumina as claimed in claim 1 wherein the pH of the wetted alumina is adjusted to fall within the range 6–12.5.

8. The method of treating a charge alumina as claimed in claim 1 wherein the pH of the wetted alumina is adjusted to fall within the range of 6–10.

9. The method of treating a charge alumina as claimed in claim 1 wherein the pH of the wetted alumina is adjusted to fall within the range of 10–12.5.

10. The method of treating a charge alumina as claimed in claim 1 wherein the pH of the wetted alumina is adjusted by addition thereto of aqueous ammonium hydroxide.

11. The method of treating a charge alumina as claimed in claim 1 wherein the pH of the wetted alumina is adjusted by addition thereto of an organic base containing at least one nitrogen atom.

12. The method of treating a charge alumina as claimed in claim 1 wherein the pH of the wetted alumina is adjusted by addition thereto of an alkyl amine.

13. The method of treating a charge alumina as claimed in claim 1 wherein the pH of the wetted alumina is adjusted by addition thereto of an alkyl amine having a total of 4–8 carbon atoms present in all the alkyl groups.

14. The method of treating a charge alumina as claimed in claim 1 wherein the pH of the wetted alumina is adjusted by addition thereto of a tetra-alkyl ammonium hydroxide.

15. The method of treating a charge alumina as claimed in claim 1 wherein the pH of the wetted alumina is adjusted by addition thereto of tetramethyl ammonium hydroxide.

16. The method of treating a charge alpha alumina monohydrate characterized by high purity, by substantial absence of alkali metal ions, and by presence of titanium as a principal impurity, which comprises (i) calcining said charge alpha alumina monohydrate at temperature of about 800° F–900° F for 1–3 hours thereby forming a calcined charge alumina containing gamma alumina;

(ii) mixing said calcined charge alumina containing gamma alumina with about 2–10 times its weight of water thereby forming a wetted alumina;

(iii) adjusting the pH of said wetted alumina to about 6–12.5;

(iv) heating said wetted alumina at pH of about 6–12.5 to about 190° F–250° F for 8–24 hours thereby forming a heated alumina containing beta alumina trihydrate.

17. The method of treating a charge alumina as claimed in claim 16 wherein said adjusting is carried out during said mixing step.

18. The method of treating a charge alumina as claimed in claim 16 wherein said adjusting is carried out subsequent to said mixing step.

19. The method of treating a charge alpha alumina monohydrate characterized by high purity, by substantial absence of alkali metal ions, and by presence of titanium as a principal impurity which consists essentially of:

(i) calcining said charge alpha alumina monohydrate at temperature of about 800° F–900° F for 1–3 hours thereby forming a calcined charge alumina containing gamma alumina;

(ii) mixing said calcined charge alumina containing gamma alumina with about 2–10 times its weight of water thereby forming a wetted alumina; and (iii) heating said wetted alumina, containing the water added in said mixing step, at pH of 6–12.5 to about 190° F–250° F for 8–24 hours thereby forming a heated alumina containing beta alumina trihydrate.

* * * * *

UNITED STATES PATENT AND TRADEMARK OFFICE
CERTIFICATE OF CORRECTION

PATENT NO. : 4,089,811
DATED : May 16, 1978
INVENTOR(S) : Koniz et al

It is certified that error appears in the above-identified patent and that said Letters Patent are hereby corrected as shown below:

Col. 10, line 46, after "containing", insert -- all --.

Signed and Sealed this

Tenth Day of November 1981

[SEAL]

Attest:

GERALD J. MOSSINGHOFF

*Attesting Officer*  *Commissioner of Patents and Trademarks*